(12) United States Patent
Iwasaki et al.

(10) Patent No.: US 11,177,723 B2
(45) Date of Patent: Nov. 16, 2021

(54) ROTOR AND MOTOR

(71) Applicant: Nidec Corporation, Kyoto (JP)

(72) Inventors: Shuji Iwasaki, Kyoto (JP); Takao Atarashi, Kyoto (JP); Takahiro Uetani, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 104 days.

(21) Appl. No.: 16/667,978

(22) Filed: Oct. 30, 2019

(65) Prior Publication Data

US 2020/0153314 A1    May 14, 2020

(30) Foreign Application Priority Data

Nov. 14, 2018 (JP) .............................. JP2018-213797

(51) Int. Cl.
*H02K 11/215* (2016.01)
*H02K 7/00* (2006.01)

(52) U.S. Cl.
CPC ........... *H02K 11/215* (2016.01); *H02K 7/003* (2013.01)

(58) Field of Classification Search
CPC .............................. H02K 11/215; H02K 7/003
See application file for complete search history.

(56) References Cited

U.S. PATENT DOCUMENTS

2017/0040874 A1* 2/2017 Han ........................ G01D 11/30

FOREIGN PATENT DOCUMENTS

JP            2012-16235 A      1/2012

* cited by examiner

*Primary Examiner* — Terrance L Kenerly
(74) *Attorney, Agent, or Firm* — Keating & Bennett

(57) ABSTRACT

A rotor includes a shaft extending along a central axis, a sensor magnet positioned on one axial side of the shaft, a magnet holder that includes a circumferential wall which is open on another axial side and accommodates an end portion on the one axial side of the shaft and the sensor magnet therein, and a support wall positioned on the one axial side of the sensor magnet, the magnet holder being fixed to the shaft, and a filling that fills an inside of the circumferential wall. The sensor magnet is sandwiched between the support wall and the filling in an axial direction.

10 Claims, 4 Drawing Sheets

ROTOR AND MOTOR

CROSS REFERENCE TO RELATED APPLICATION

The present application claims priority under 35 U.S.C. § 119 to Japanese Application No. 2018-213797 filed on Nov. 14, 2018, the entire contents of which are hereby incorporated herein by reference.

1. Field of the Invention

The present disclosure relates to a rotor and a motor.

2. Background

There is known a motor including a rotor in which a magnet whose magnetism is detected by a magnetic sensor is fixed to a shaft via a holder. For example, there is known a configuration in which a magnet is accommodated in a housing cylindrical portion of a holder.

In the motor as described above, however, there is a concern that the magnet may come out of the housing cylindrical portion to be detached from the shaft.

SUMMARY

One example embodiment of a rotor of the present disclosure includes a shaft extending along a central axis, a sensor magnet positioned on one axial side of the shaft, a magnet holder that includes a circumferential wall which is open on another axial side and accommodates an end portion on the one axial side of the shaft and the sensor magnet therein, and a support wall positioned on the one axial side of the sensor magnet, the magnet holder being fixed to the shaft, and a filling that fills an inside of the circumferential wall. The sensor magnet is sandwiched between the support wall and the filling in an axial direction.

One example embodiment of a motor of the present disclosure includes the above-described rotor.

The above and other elements, features, steps, characteristics and advantages of the present disclosure will become more apparent from the following detailed description of the example embodiments with reference to the attached drawings.

DETAILED DESCRIPTION

A Z-axis direction appropriately illustrated in each drawing is an up-and-down direction in which a positive side is an "upper side" and a negative side is a "lower side". A central axis J appropriately illustrated in each drawing is a virtual line which is parallel to the Z-axis direction and extends in the up-and-down direction. In the following description, an axial direction of the central axis J, that is, a direction parallel to the up-and-down direction will be simply referred to as the "axial direction". A radial direction centered on the central axis J will be simply referred to as the "radial direction". A circumferential direction centered on the central axis J will be simply referred to as the "circumferential direction". In an example embodiment of the present disclosure, the upper side corresponds to one axial side. The lower side corresponds to the other axial side.

Note that the up-and-down direction, the upper side, and the lower side are simply names for describing an arrangement relationship of each portion, and an actual arrangement relationship or the like may be an arrangement relationship other than the arrangement relationship indicated by these names.

Figure 1:
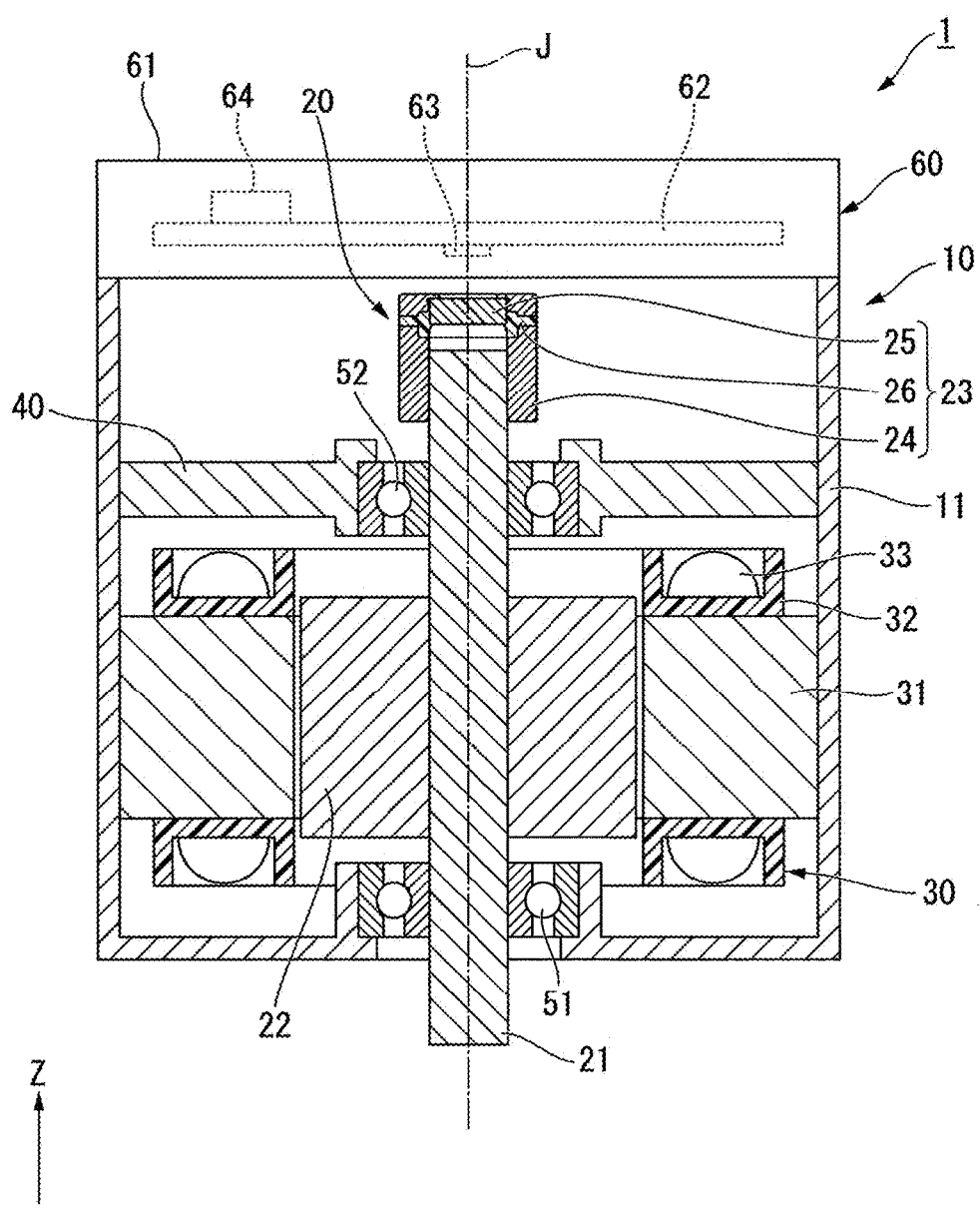
FIG. 1 is a cross-sectional view illustrating a motor according to an example embodiment of the present disclosure.

A drive device 1 according to the example embodiment illustrated in FIG. 1 is, for example, an electric power steering device. As illustrated in FIG. 1, the drive device 1 includes a motor 10 and a control device 60. The motor 10 is attached to the control device 60 provided in the drive device 1. The motor 10 includes a housing 11, a rotor 20, a stator 30, a bearing holder 40, and bearings 51 and 52. The housing 11 accommodates the rotor 20, the stator 30, the bearing holder 40, and the bearings 51 and 52. The housing 11 has, for example, a cylindrical shape that is open on the upper side.

The stator 30 opposes the rotor 20 with a gap in the radial direction. For example, the stator 30 is arranged radially outside of the rotor 20. The stator 30 includes a stator core 31, and insulator 32, and a plurality of coils 33. The plurality of coils 33 are attached to the stator core 31 with the insulator 32 interposed therebetween. The bearing holder 40 holds the bearing 52.

The rotor 20 is rotatable about the central axis J. The rotor 20 includes a shaft 21, a rotor body 22, and a detection target portion 23. The shaft 21 extends along the central axis J. The shaft 21 has a columnar shape that extends in the axial direction with the central axis J as the center. The shaft 21 is supported by bearings 51 and 52 so as to be rotatable about the central axis J. Although not illustrated, the rotor body 22 has a rotor core fixed to the shaft 21, and a rotor magnet fixed to the rotor core.

Figure 2:
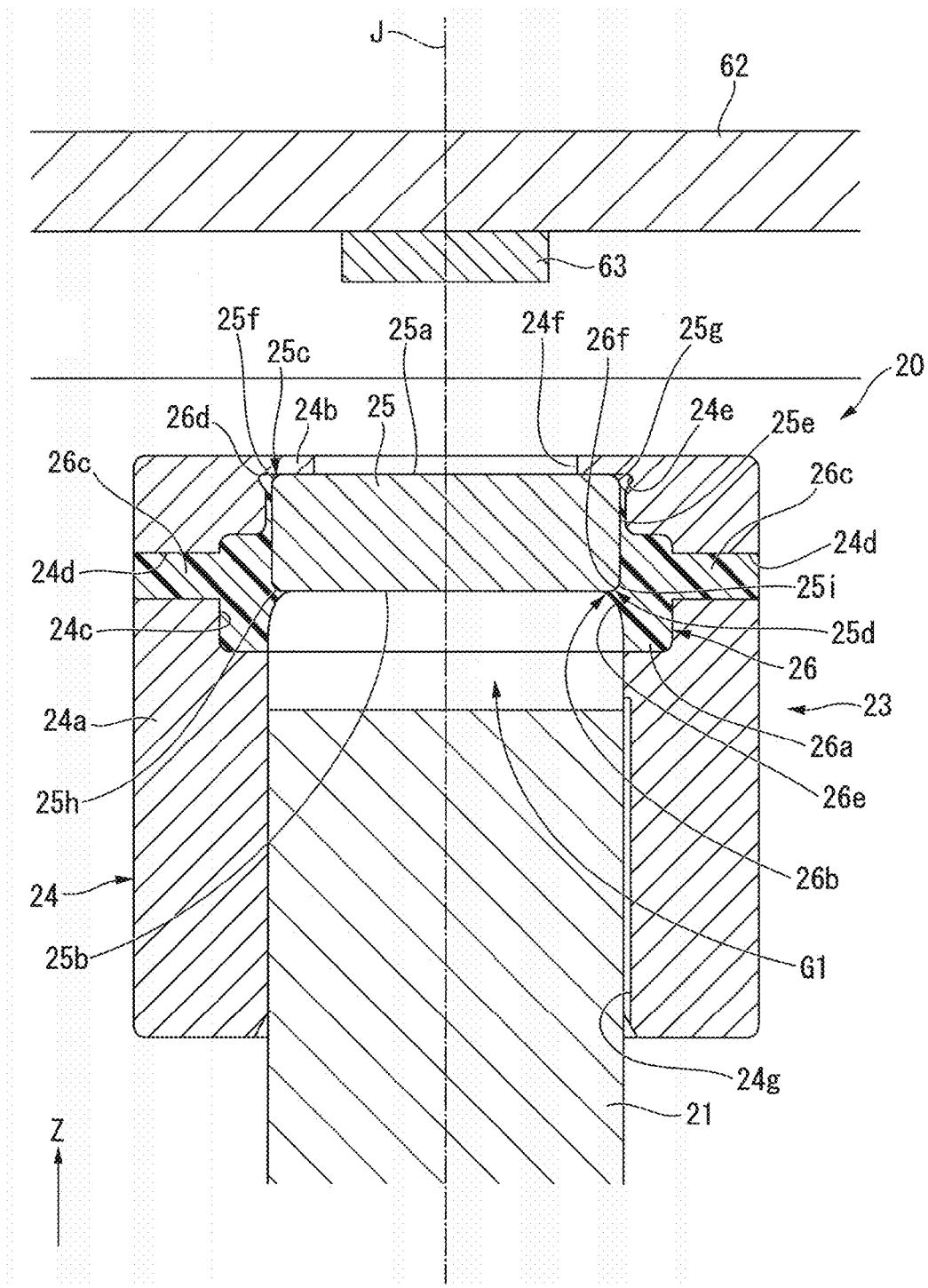
FIG. 2 is a cross-sectional view illustrating a portion of a rotor according to an example embodiment of the present disclosure.

The detection target portion 23 is attached to the shaft 21. As illustrated in FIG. 2, the detection target portion 23 includes a magnet holder 24, a sensor magnet 25, and a filling member 26. That is, the rotor 20 includes the magnet holder 24, the sensor magnet 25, and the filling member 26. The magnet holder 24 is fixed to an upper end portion of the shaft 21. The magnet holder 24 is a non-magnetic member, for example. The magnet holder 24 is made of metal, for example. The magnet holder 24 has a circumferential wall 24a and a support wall 24b.

The circumferential wall 24a is open on the lower side and accommodates the upper end portion of the shaft 21 and the sensor magnet 25 therein. The circumferential wall 24a has, for example, a cylindrical shape centered on the central axis J. The upper end portion of the shaft 21 is press-fitted into the inside of the circumferential wall 24a from the lower side. As a result, the magnet holder 24 can be firmly and easily fixed to the shaft 21.

The circumferential wall 24a has a first concave portion 24c and a second concave portion 24e which are recessed to the radially outer side from an inner circumferential surface of the circumferential wall 24a. The first concave portion 24c and the second concave portion 24e have, for example, an annular shape extending along the circumferential direction. The first concave portion 24c is positioned above the axial center of the circumferential wall 24a. The first concave portion 24c is arranged to be separated on the lower side from an upper end portion on the inner circumferential surface of the circumferential wall 24a. The first concave portion 24c is positioned on the upper side of the upper end portion of the shaft 21. The second concave portion 24e is positioned on the upper side of the first concave portion 24c. The second concave portion 24e is positioned at the upper end portion of the inner circumferential surface of the circumferential wall 24a. An inner diameter of the second concave portion 24e is smaller than an inner diameter of the first concave portion 24c.

The circumferential wall 24a has a first through-hole 24d that connects the inside of the circumferential wall 24a and the outside of the magnet holder 24. That is, the magnet holder has the first through-hole 24d. The inside of the circumferential wall 24a includes, for example, the inside of the first concave portion 24c and the inside of the second concave portion 24e. For example, the first through-hole 24d extends in the radial direction and penetrates from an outer circumferential surface of the circumferential wall 24a to a surface positioned on the radially outer side in an inner surface of the first concave portion 24c. As a result, the first through-hole 24d connects the inside of the first concave portion 24c and the outside of the magnet holder 24. For example, a pair of the first through-holes 24d is provided so as to sandwich the central axis J in the radial direction. The first through-hole 24d is closed by the filling member 26, for example.

The circumferential wall 24a has a groove 24g that is recessed to the radially outer side from the inner circumferential surface of the circumferential wall 24a. The groove 24g extends in the axial direction. An upper end portion of the groove 24g is positioned on the lower side of the first concave portion 24c, and is positioned on the upper side of the upper end portion of the shaft 21. A lower end portion of the groove 24g is positioned at the lower end portion of the circumferential wall 24a. The groove 24g is open on the lower side. The groove 24g connects, for example, the inside of the circumferential wall 24a and the outside of the circumferential wall 24a.

The support wall 24b is positioned on the upper side of the sensor magnet 25. For example, the support wall 24b expands to the radially inner side from the upper end portion of the circumferential wall 24a. The support wall 24b has a plate shape whose plate surface is directed in the axial direction. The support wall 24b has, for example, a second through-hole 24f that penetrates the support wall 24b in the axial direction. That is, the magnet holder 24 has the second through-hole 24f. The second through-hole 24f has, for example, a circular shape centered on the central axis J. Since the second through-hole 24f is provided, the support wall 24b has an annular plate shape centered on the central axis J.

An inner diameter of the second through-hole 24f is smaller than an outer diameter of the sensor magnet 25. It is desirable that the inner diameter of the second through-hole 24f be large. The larger the inner diameter of the second through-hole 24f becomes, the smaller the protruding amount of the support wall 24b becomes. As a result, even if an axial dimension of the support wall 24b is decreased, it is easy to suppress a problem such as the support wall 24b protruding obliquely with respect to the radial direction. Therefore, it is easy to form the support wall 24b with high accuracy.

The sensor magnet 25 is positioned on the upper side of the shaft 21. For example, the sensor magnet 25 is arranged to be separated to the upper side from the shaft 21 inside the circumferential wall 24a. A gap G1 is provided between the sensor magnet 25 and the shaft 21 in the axial direction. The sensor magnet 25 has, for example, a disk shape centered on the central axis J. The outer diameter of the sensor magnet 25 is smaller than an outer diameter of the upper end portion of the shaft 21. The sensor magnet 25 overlaps with the second through-hole 24f when viewed along the axial direction.

The sensor magnet 25 has a first boundary portion 25c, which is a boundary between an outer circumferential surface 25e and an upper end surface 25a, and a second boundary portion 25d which is a boundary between the outer circumferential surface 25e and a lower end surface 25b. The first boundary portion 25c and the second boundary portion 25d are annular shape provided over the entire circumference of the sensor magnet 25. The first boundary portion 25c and the second boundary portion 25d are, for example, rounded. The first boundary portion 25c is a rounded portion in which a corner portion provided at a radially outer circumferential edge of the upper end of the sensor magnet 25 is rounded. The second boundary portion 25d is a rounded portion in which a corner provided at a radially outer circumferential edge of a lower end portion of the sensor magnet 25 is round-chamfered.

At least one of the first boundary portion 25c and the second boundary portion 25d has parts having mutually different circumferential positions and shapes. For example, both the first boundary portion 25c and the second boundary portion 25d have different-shaped parts having mutually different circumferential positions and shapes.

In the present specification, the expression, "shapes are different from each other" includes that curvatures are different from each other in the case of the rounded shape. For example, the different-shaped parts provided in the first boundary portion 25c and having mutually different circumferential positions and shapes have mutually different curvatures. The different-shaped parts provided in the second boundary portion 25d and having mutually different circumferential positions and shapes have mutually different curvatures. Specifically, for example, in the first boundary portion 25c illustrated in FIG. 2, a different-shaped part 25f, which is a part positioned on the left side, and a different-shaped part 25g, which is a part positioned on the right side, have curvatures different from each other. In addition, for example, in the second boundary portion 25d illustrated in FIG. 2, a different-shaped part 25h, which is a part positioned on the left side, and a different-shaped part 25i, which is a part positioned on the right side, have curvatures different from each other.

The round-chamfering process of the sensor magnet 25 is performed by barrel polishing, for example. The barrel polishing has relatively low processing accuracy, and curvatures of round-chamfered parts are likely to vary. Thus, for example, a curvature of the first boundary portion 25c and a curvature of the second boundary portion 25d round-chamfered by the barrel polishing are likely to vary in the circumferential direction. Therefore, it is possible to easily form the first boundary portion 25c and the second boundary portion 25d which include the different-shaped parts 25f, 25g, 25h, and 25i having mutually different circumferential positions and shapes by performing the round-chamfering by the barrel polishing.

The radially outer circumferential edge of the upper end surface 25a of the sensor magnet 25 is in contact with a lower surface of the support wall 24b over the entire circumference. As a result, a lower opening of the second through-hole 24f is closed by the sensor magnet 25. A part of the upper end surface 25a of the sensor magnet 25 that is positioned on the radially inner side of the support wall 24b is exposed on the upper side of the magnet holder 24. The lower end portion of the sensor magnet 25 is arranged at a position overlapping with the first through-hole 24d as viewed along the radial direction in which the first through-hole 24d extends.

The filling member 26 is made of resin. The filling member 26 fills the inside of the circumferential wall 24a. Note that the expression, "the filling member fills the inside of the circumferential wall" in this specification is satisfied if the filling member is provided in at least a part of the inside of the circumferential wall, and it is unnecessary to provide the filling member in the entire inside of the circumferential wall. For example, the filling member 26 is provided only in a part of the inside of the circumferential wall 24a. The filling member 26 is positioned on the upper side of the upper end portion of the shaft 21.

The filling member 26 includes, for example, an annular portion 26a, a support portion 26b, plug portions 26c, and an interposition portion 26d. The annular portion 26a has an annular shape centered on the central axis J. The annular portion 26a fills the entire inner portion of first concave portion 24c. The annular portion 26a surrounds a lower part of the sensor magnet 25 from the radially outer side. An inner circumferential surface in an upper part of the annular portion 26a is in contact with the lower part of the outer circumferential surface 25e of the sensor magnet 25.

The support portion 26b protrudes to the radially inner side from the inner circumferential surface of the annular portion 26a. The support portion 26b is positioned on the lower side of the sensor magnet 25. The support portion 26b supports the sensor magnet 25 from the lower side. The support portion 26b is arranged at a position overlapping with the support wall 24b when viewed along the axial direction. Since the support portion 26b is provided, the sensor magnet 25 is sandwiched between the support wall 24b and the filling member 26 in the axial direction. As a result, the sensor magnet 25 is prevented from moving in the axial direction, and the sensor magnet 25 is prevented from coming out of the magnet holder 24. Therefore, it is possible to prevent the sensor magnet 25 from being detached from the shaft 21.

According to the example embodiment, the sensor magnet 25 is not provided with a cut-out. Thus, the amount of magnetic flux emitted by the sensor magnet 25 is large as compared with the case of employing a sensor magnet which has the same size as the sensor magnet 25 and is provided with a cut-out. As a result, even if an axial dimension of the sensor magnet 25 is decreased, it is easy to ensure the amount of magnetic flux to be emitted from the sensor magnet 25. Therefore, the sensor magnet 25 can be downsized in the axial direction, and the entire rotor 20 can be downsized in the axial direction.

The support portion 26b is, for example, an annular shape surrounding the central axis J. More specifically, the support portion 26b has an annular shape centered on the central axis J. The support portion 26b is in contact with the radially outer circumferential edge of the lower end surface 25b of the sensor magnet 25. Since the support portion 26b is annular in the present example embodiment, a part, positioned on the radially inner side of the support portion 26b, of the lower end surface 25b of the sensor magnet 25 is exposed on the lower side from the filling member 26. The part positioned on the radially inner side of the support portion 26b in the lower end surface 25b of the sensor magnet 25 opposes the upper end surface of the shaft 21 with the gap G1 interposed therebetween.

A lower surface of the support portion 26b is a concave curved surface 26e that is positioned on the lower side as proceeding to the radially outer side. An upper surface of the support portion 26b is a concave curved surface 26f positioned on the upper side as proceeding to the radially outer side. The concave curved surface 26f has a shape along the second boundary portion 25d. The concave curved surface 26f is in contact with the second boundary portion 25d and covers the second boundary portion 25d from the lower side and the radially outer side. As a result, each of the different-shaped parts 25h and 25i having mutually different circumferential positions and shapes in the second boundary portion 25d is in contact with the filling member 26. Thus, for example, when one of the different-shaped parts 25h and 25i having mutually different shapes in the second boundary portion 25d is positioned on the radially outer side of the other, the one of the different-shaped parts 25h and 25i having mutually different shapes in the second boundary portion 25d is caught in the circumferential direction on a part of the filling member 26 in contact with the other. Therefore, the sensor magnet 25 can be prevented from rotating in the circumferential direction with respect to the filling member 26.

According to the example embodiment, the different-shaped parts 25h and 25i having mutually different circumferential positions and shapes in the second boundary portion 25d are the parts that are rounded and have mutually different curvatures. Thus, it is possible to easily form the second boundary portion 25d including the different-shaped parts 25h and 25i having mutually different circumferential positions and curvatures using the barrel polishing as described above. Since the chamfering accuracy of the sensor magnet 25 can be relatively lowered, it is possible to reduce manufacturing cost of the sensor magnet 25.

The plug portion 26c extends to the radially outer side from the annular portion 26a. A pair of the plug portions 26c are provided while sandwiching the central axis J. The pair of plug portions 26c fills the entire inside of the pair of first through-holes 24d, respectively. Since the plug portion 26c is caught on an inner surface of the first through-hole 24d, the filling member 26 can be prevented from rotating in the circumferential direction with respect to the magnet holder 24.

The interposition portion 26d extends to the upper side from a radially inner end of the annular portion 26a. The interposition portion 26d is a part filling a radial gap between a part of the sensor magnet 25 positioned on the upper side of the first concave portion 24c and the inner circumferential surface of the circumferential wall 24a. The interposition portion 26d also fills the entire inside of the second concave portion 24e. The interposition portion 26d is in contact with the first boundary portion 25c of the sensor magnet 25, and covers the first boundary portion 25c from the upper side and the radially outer side. As a result, each of the different-shaped parts 25f and 25g having mutually different circumferential positions and shapes in the first boundary portion 25c is in contact with the filling member 26. Thus, it is possible to prevent the rotation of the sensor magnet 25 in the circumferential direction in the same manner as the second boundary portion 25d described above.

A part positioned on the lower side of the second concave portion 24e in the interposition portion 26d may be provided over the entire circumference or may be provided only partially in the circumferential direction. For example, there is a case where the sensor magnet 25 is displaced in the radial direction from a position illustrated in FIG. 2 so that the outer circumferential surface 25e of the sensor magnet 25 comes into contact partially with a part, positioned between the first concave portion 24c and the second concave portion 24e in the axial direction, in the inner circumferential surface of the circumferential wall 24a. In this case, the part of the interposition portion 26d positioned on the lower side of the second concave portion 24e is provided only partially in the circumferential direction. In addition, the interposition portion 26d is not necessarily provided when the outer diameter of the sensor magnet 25 is substantially the same as the inner diameter of the circumferential wall 24a so that the outer circumferential surface 25e of the sensor magnet 25 is in contact with the entire circumference of the part positioned between the first concave portion 24c and the second concave portion 24e in the inner circumferential surface of the circumferential wall 24a.

As illustrated in FIG. 1, the control device 60 is fixed to the upper side of the motor 10. The control device 60 includes a case 61, a circuit board 62, a magnetic sensor 63, and a controller 64. The case 61 accommodates the circuit board 62 and the magnetic sensor 63. The circuit board 62 has a plate shape whose plate surface is directed in the axial direction. For example, an inverter circuit is provided on the circuit board 62.

The magnetic sensor 63 is attached to a lower surface of the circuit board 62. As illustrated in FIG. 2, the magnetic sensor 63 is positioned on the upper side of the sensor magnet 25. The magnetic sensor 63 detects a magnetic field of the sensor magnet 25. The magnetic sensor 63 detects the rotation of the rotor 20 by detecting a change in the magnetic field of the sensor magnet 25. The magnetic sensor 63 is, for example, a magnetoresistive element. The magnetic sensor 63 may be a Hall element such as a Hall IC. The controller 64 is attached to an upper surface of the circuit board 62. The controller 64 controls supply of power to a coil 33 provided in the stator 30 based on a detection result of the magnetic sensor 63.

Here, the magnet holder 24 is provided with the second through-hole 24f penetrating the support wall 24b in the axial direction according to the example embodiment. Thus, when the sensor magnet 25 and the second through-hole 24f are arranged at positions overlapping with each other as viewed along the axial direction, it is possible to make a part of the upper end surface 25a of the sensor magnet 25 exposed to the outside of the magnet holder 24 through the second through-hole 24f. As a result, an axial position of the end surface 25a of the sensor magnet 25 can be confirmed from the outside of the rotor 20. Therefore, the magnetic sensor 63 can be easily arranged at a position where a distance between the magnetic sensor 63 and the sensor magnet 25 in the axial direction is suitable. Even when the axial dimension of the support wall 24b is increased, the magnetic sensor 63 can be arranged to be close to the sensor magnet 25, for example, by inserting the magnetic sensor 63 into the second through-hole 24f.

A worker or the like who assembles the rotor 20 inserts the sensor magnet 25 into the circumferential wall 24a from the lower side to bring the upper end surface 25a of the sensor magnet 25 into contact with the lower surface of the support wall 24b. At this time, the second concave portion 24e is provided at the upper end portion in the inner circumferential surface of the circumferential wall 24a. Thus, the first boundary portion 25c, which is the corner of the sensor magnet 25, can be released by the second concave portion 24e, for example, even in a state where the first boundary portion 25c on the upper side of the sensor magnet 25 is not chamfered. As a result, the sensor magnet 25 can be suitably inserted deeply into the circumferential wall 24a to come into contact with the support wall 24b.

Note that the "worker or the like" in this specification includes a worker and an assembling device who perform each work. Each work may be performed only by the worker, may be performed only by the assembling device, or may be performed by the worker and the assembling device.

Figure 3:
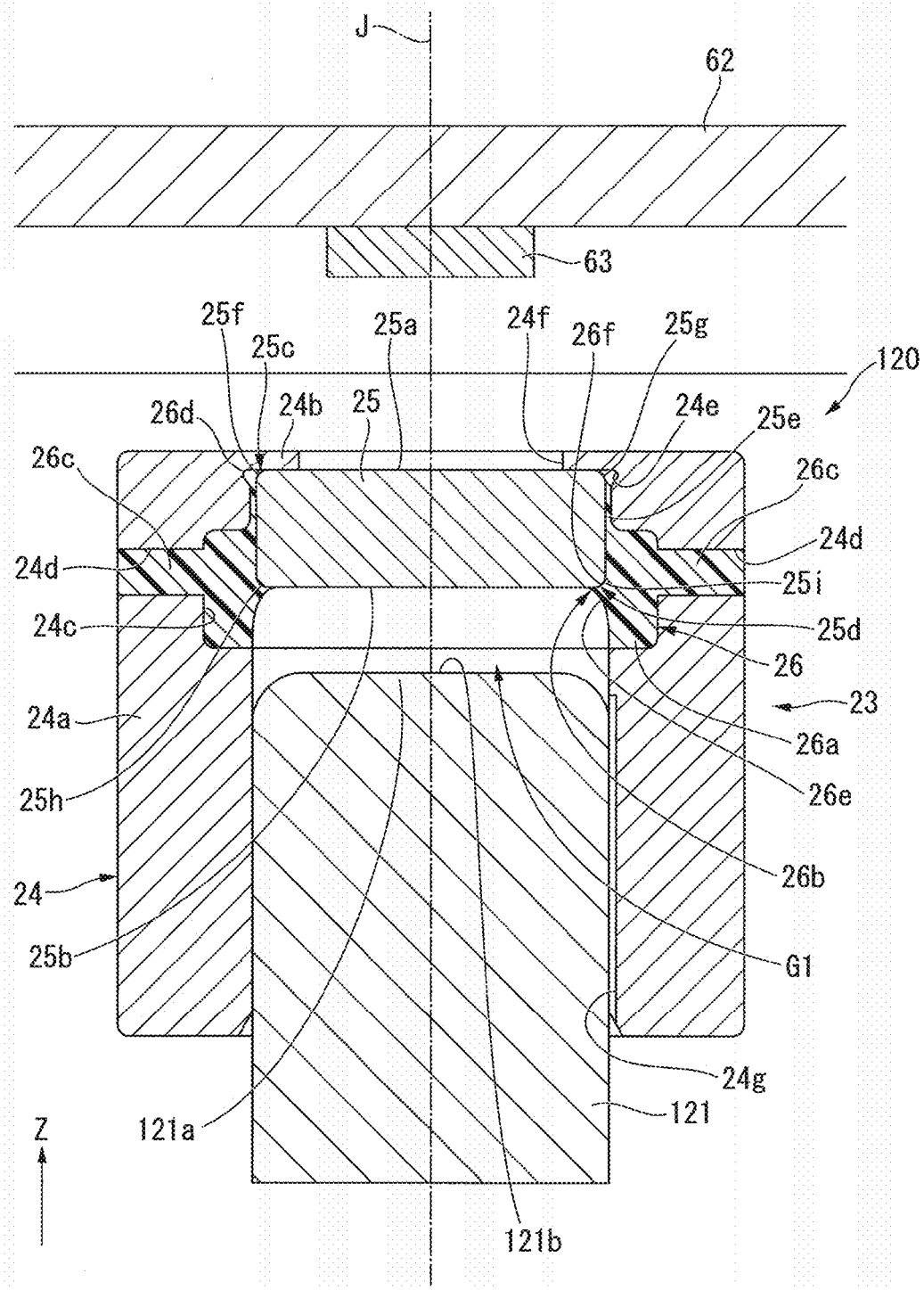
FIG. 3 is a cross-sectional view illustrating a portion of an assembling procedure of the rotor according to an example embodiment of the present disclosure.

As illustrated in FIG. 3, the worker or the like inserts a pin P into the circumferential wall 24a from the lower side of the sensor magnet 25 after inserting the sensor magnet 25 or at the same time of inserting the sensor magnet 25. The worker or the like brings an upper end portion of the pin P into contact with the lower end surface 25b of the sensor magnet 25 and presses the sensor magnet 25 against the support wall 24b with the pin P.

The pin P has a columnar shape extending in the axial direction. An outer diameter of the pin P is substantially the same as the inner diameter of the circumferential wall 24a and is larger than the outer diameter of the sensor magnet 25. In a state where the pin P is inserted, the lower opening of the circumferential wall 24a is closed by the pin P. A pin boundary portion Pa, which is a boundary between an outer circumferential surface of pin P and an upper end surface of pin P, is a rounded part obtained by round-chamfering a corner provided at a radially outer circumferential edge in the upper end portion of the pin P. The pin boundary portion Pa is positioned on the lower side of the second boundary portion 25d of the sensor magnet 25. Since the pin boundary portion Pa and the second boundary portion 25d are rounded, a gap G2 is provided between the pin boundary portion Pa and the second boundary portion 25d in the axial direction.

The worker or the like uses a dispenser D to flow a molten resin M from the first through-hole 24d into the circumferential wall 24a in a state where the sensor magnet 25 is held in the circumferential wall 24a by the pin P. The filling member 26 is formed by curing the resin M that has flown into the circumferential wall 24a. Here, the support portion 26b is formed by the resin M that has entered the gap G2. As a result, even if the pin P is pulled out of the circumferential wall 24a, the sensor magnet 25 can be supported from the lower side by the support portion 26b.

When the resin M is poured, the upper end surface of the pin P is in contact with the lower end surface 25b of the sensor magnet 25. Thus, the resin M does not enter the radially inner side of the gap G2 in the axial direction between the pin P and the sensor magnet 25. As a result, the support portion 26b is molded in the annular shape surrounding the central axis J. In addition, a part of the lower end surface 25b of the sensor magnet 25 that is on the radially inner side of the support portion 26b is not covered with the filling member 26 and is in the state of being exposed to the lower side from the filling member 26.

As the resin M is poured into the circumferential wall 24a in the state where the pin P in contact with the lower end surface 25b of the sensor magnet 25 in this manner, the support portion 26b of the filling member 26 is molded in the annular shape surrounding the central axis J. In other words, since the support portion 26b has the annular shape surrounding the central axis J, it is possible to employ a method of pouring the resin M into the circumferential wall 24a in the state where the pin P is in contact with the lower end surface 25b of the sensor magnet 25 when the filling member 26 is formed by pouring the resin M into the circumferential wall 24a according to this example embodiment. Therefore, it is possible to the movement of the sensor magnet 25 in the axial direction using the pin P when the resin M has flown into the circumferential wall 24a, and the sensor magnet 25 can be held in the circumferential wall 24a with high positional accuracy.

In addition, since the support portion 26b is formed using the gap G2 between the round-chamfered pin boundary portion Pa and the sensor magnet 25, the lower surface of the support portion 26b can be formed as the concave curved surface 26e that is positioned on the lower side as proceeding to the radially outer side. In other words, since the lower surface of the support portion 26b is the concave curved surface 26e, it is possible to employ a method of forming the support portion 26b using the round-chamfered pin boundary portion Pa. As a result, it is easy to form the support portion 26b using the pin P having a simple shape.

Since the first through-hole 24d that connects the inside of the circumferential wall 24a and the outside of the magnet holder 24 is provided, the resin M can be poured into the circumferential wall 24a through the first through-hole 24d even in a state where the pin P is inserted to close the lower opening of the circumferential wall 24a. As a result, the filling member 26 is molded while suitably supporting the sensor magnet 25 using the pin P.

After the filling member 26 is molded, the worker or the like pulls out the pin P from the circumferential wall 24a and press-fits the upper end portion of the shaft 21 to the circumferential wall 24a from the lower side. At this time, the groove 24g is provided in the circumferential wall 24a, and thus, air in the circumferential wall 24a can be discharged to the outside through the groove 24g while press-fitting the shaft 21. As a result, the first through-hole 24d is closed by the plug portion 26c, and the shaft 21 can be easily press-fitted into the circumferential wall 24a even when the second through-hole 24f is closed by the sensor magnet 25.

The present disclosure is not limited to the above-described example embodiment, and the following other configurations can be also employed. The magnet holder is not necessarily made of metal. The magnet holder may be made of resin, for example. In this case, the magnet holder may be molded using the same resin material as the filling member, for example.

The shape of the magnet holder is not particularly limited as long as the magnet holder has the circumferential wall and the support wall. The shape of the circumferential wall is not particularly limited as long as the circumferential wall is open on the lower side and can accommodate the upper end portion of the shaft and the sensor magnet inside. The first through-hole is not necessarily provided in the circumferential wall if being provided in the magnet holder. For example, the first through-hole may be provided in the support wall. The first through-hole is not necessarily closed by the filling member. In addition, the first through-hole is not necessarily provided. In this case, for example, the filling member can be formed by pouring the resin M from the lower opening of the circumferential wall without using the pin P described above. The circumferential wall does not necessarily have the groove.

The shape of the support wall is not particularly limited as long as the support wall is positioned on the upper side of the sensor magnet and can sandwich the sensor magnet with the filling member in the axial direction. The support wall does not necessarily have the second through-hole. In this case, the support wall may cover the entire upper side of the sensor magnet. The support wall is not necessarily annular. A plurality of the support walls may be provided at intervals along the circumferential direction.

The shape of the sensor magnet is not particularly limited. The sensor magnet may be annular, for example. The first boundary portion of the sensor magnet may have a shape in which a corner portion of the sensor magnet is angular-chamfered. The first boundary portion of the sensor magnet may have an angular-chamfered portion and a rounded portion obtained by round-chamfering along the circumferential direction. In this case, the angular-chamfered portion and the rounded portion obtained by round-chamfering correspond to the different-shaped parts having mutually different circumferential positions and shapes. One or both of the first boundary portion and the second boundary portion of the sensor magnet do not necessarily have the different-shaped parts that have mutually different circumferential positions and shapes and are in contact with the filling member. The sensor magnet may be bonded to the inner surface of the magnet holder with an adhesive, for example. The sensor magnet may be provided with a cut-out.

The filling member is not particularly limited if sandwiching the sensor magnet with the support wall in the axial direction. The support portion of the filling member is not particularly limited as long as the sensor magnet can be supported from the lower side. The support portion is not necessarily annular, and may cover the entire lower side of the sensor magnet. In addition, a plurality of the support portions may be provided at intervals along the circumferential direction. The support portion may have a part positioned between the support wall and the sensor magnet. In this case, the sensor magnet may come into contact with the support wall through the part of the support portion.

The upper end portion of the shaft may be in contact with the lower end surface of the sensor magnet. The shaft may be fixed to the magnet holder by a method other than press-fitting. The shaft may be fixed to the magnet holder by, for example, a screw.

Figure 4:
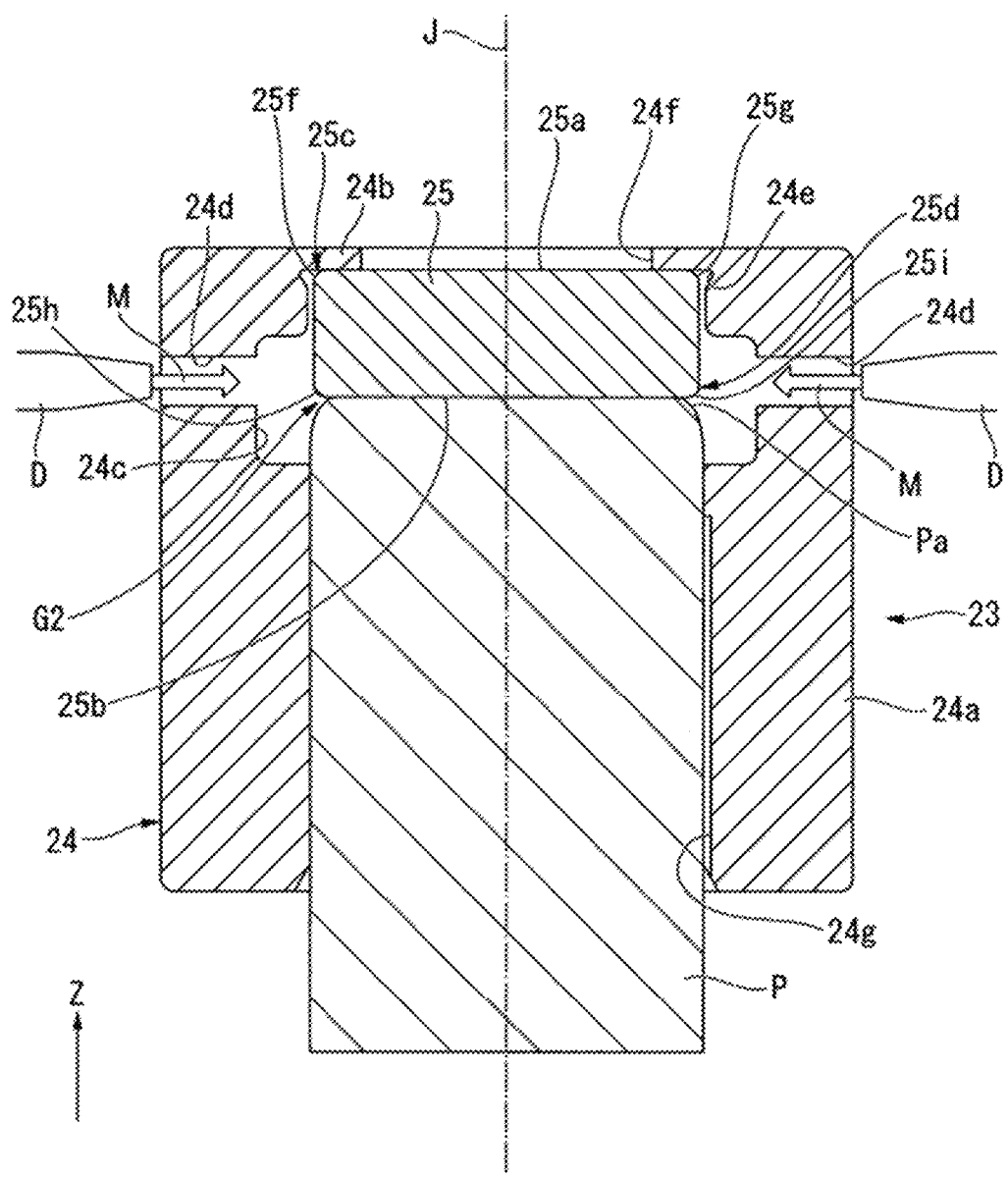
FIG. 4 is a cross-sectional view illustrating a portion of a rotor which is another example of an example embodiment of the present disclosure.

In the example embodiment described above, the upper side of the shaft 21, that is, a distal end portion on the sensor magnet 25 side, has a shape where a boundary part between the upper end surface and the outer circumferential surface is angular, but is not limited to such a shape. The shaft may have a shape such as a shaft 121 of a rotor 120 illustrated in FIG. 4. As illustrated in FIG. 4, an outer diameter of a distal end portion 121a on the upper side of the shaft 121 decreases toward the upper side. According to this configuration, the shaft 121 can be easily inserted into the circumferential wall 24a from the lower side. Thus, it is easy to attach the magnet holder 24 to the shaft 121.

An upper end surface 121b of the distal end portion 121a of the shaft 121 is positioned on the upper side the upper end portion of the groove 24g, that is, on the sensor magnet 25 side. A lower end of the distal end portion 121a is positioned on the lower side of the upper end portion of the groove 24g. In this manner, if at least a part of the distal end portion 121a is positioned on the lower side the upper end portion of the groove 24g even when the end surface 121b is positioned on the upper side of the groove 24g, a gap that connects the gap G1 and the inside of the groove 24g is provided between the distal end portion 121a and the groove 24g in the radial direction. As a result, even when the shaft 121 is press-fitted up to a position on the upper side of the groove 24g, the air inside the circumferential wall 24a can be discharged to the outside through the groove 24g in the same manner as the above-described example embodiment. Therefore, the shaft 121 can be easily press-fitted into the circumferential wall 24a.

Although the motor 10 is attached to the control device 60 provided in the drive device 1 in the above-described example embodiment, the present disclosure is not limited thereto. A motor according to another example embodiment of the present disclosure may be a mechanical integration-type motor including a control device. That is, the motor according to the other example embodiment of the present disclosure may include a magnetic sensor and a controller.

Note that an application of the motor according to the example embodiment described above is not particularly limited. The motor according to the example embodiment described above may be mounted on a vehicle or may be mounted on a device other than the vehicle. In addition, each configuration described in the present specification can be properly combined within a range having no contradiction.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor comprising:
   a shaft extending along a central axis;
   a sensor magnet positioned on one axial side of the shaft;
   a magnet holder that includes a circumferential wall which is open on another axial side of the shaft and accommodates an end portion on the one axial side of the shaft and the sensor magnet therein, and a support wall positioned on one axial side of the sensor magnet, the magnet holder being fixed to the shaft; and
   a filling that fills an inside of the circumferential wall; wherein
   the sensor magnet is sandwiched between the support wall and the filling in an axial direction; and
   the magnet holder includes a first through-hole that extends in a radial direction perpendicular to the axial direction, the first through-hole extending from a radially inside surface of the circumferential wall to a radially outside surface of the magnet holder.

2. The rotor according to claim 1, wherein
   the sensor magnet is a disk including a first boundary portion which is a boundary between an outer circumferential surface and an end surface on the one axial side, and a second boundary portion which is a boundary between the outer circumferential surface and an end surface on the other axial side; and
   at least one of the first boundary portion and the second boundary portion includes different-shaped portions that have mutually different circumferential positions and shapes and are in contact with the filling.

3. The rotor according to claim 2, wherein
   the first boundary portion and the second boundary portion are rounded; and
   the different-shaped portions have mutually different curvatures.

4. The rotor according to claim 1, wherein the magnet holder includes a second through-hole penetrating the support wall in the axial direction.

5. The rotor according to claim 1, wherein
   the filling includes a support portion positioned on an axial side of the sensor magnet; and
   the support portion has an annular shape surrounding the central axis.

6. The rotor according to claim 5, wherein a surface on the axial side of the support portion is a concave curved surface extending to a radially outer side of the rotor.

7. The rotor according to claim 1, wherein an end portion on the one axial side of the shaft is press-fitted to the inside of the circumferential wall.

8. A motor comprising the rotor according to claim 1.

9. The motor according to claim 8, further comprising a magnetic sensor that is positioned on the one axial side of the sensor magnet and detects a magnetic field of the sensor magnet.

10. The motor according to claim 9, further comprising:
    a stator that opposes the rotor with a gap interposed therebetween in the radial direction; and
    a controller that controls supply of power to a coil provided in the stator based on a detection result of the magnetic sensor.

* * * * *